Oct. 20, 1970  M. MEIER-MALETZ  3,535,182
FOIL-SHAPED SOUND RECORD AND METHOD OF MAKING SAME
Filed Nov. 16, 1966  5 Sheets-Sheet 3

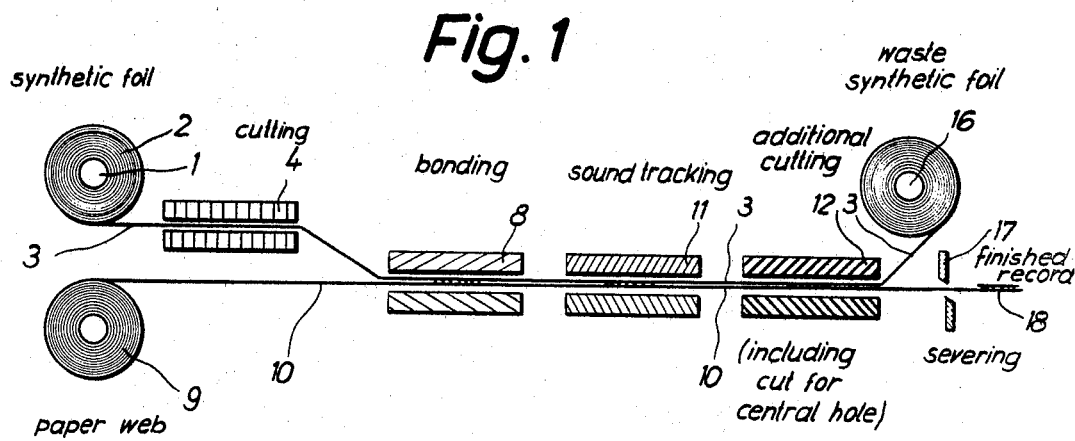
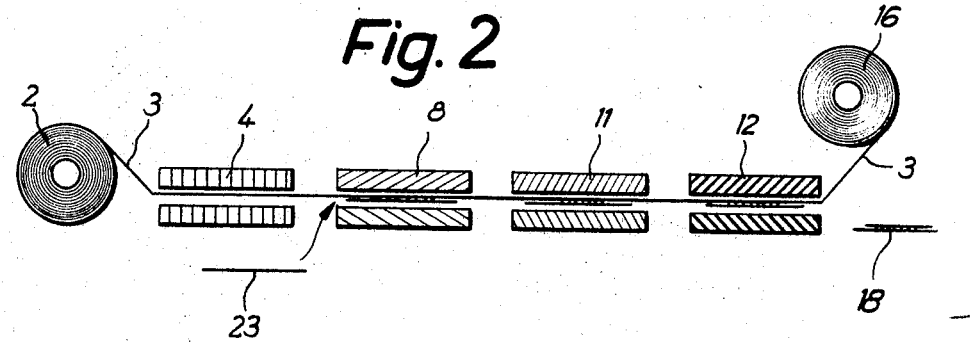
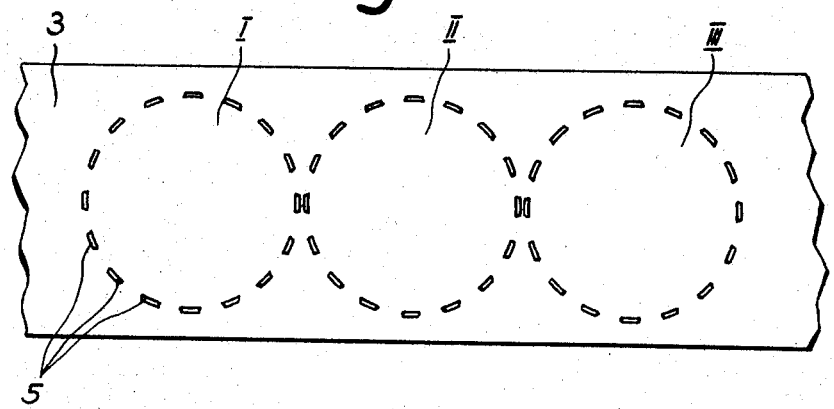

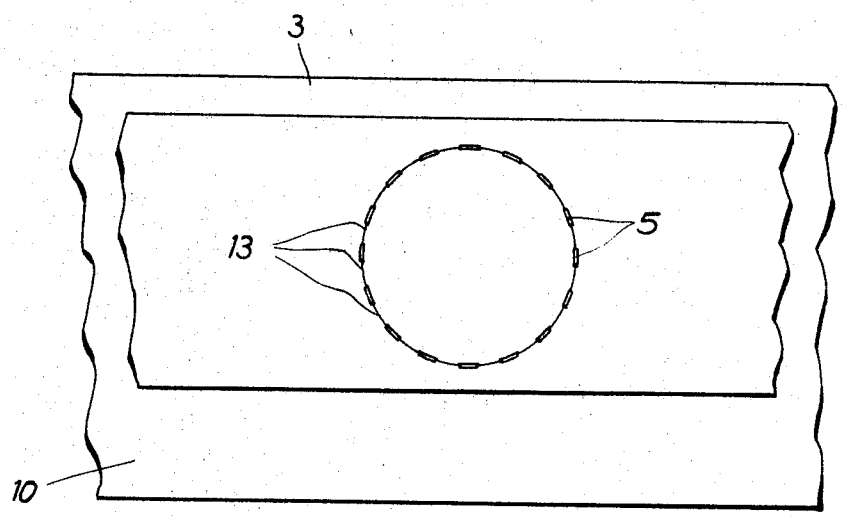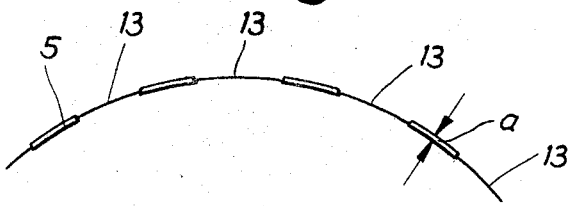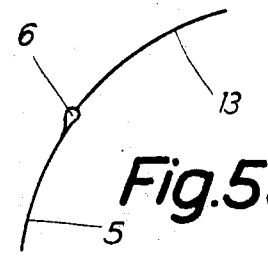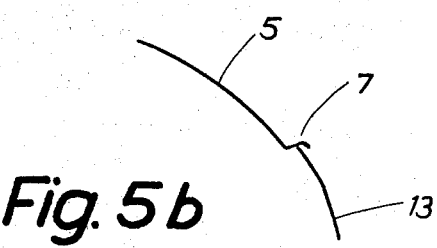

Oct. 20, 1970     M. MEIER-MALETZ     3,535,182

FOIL-SHAPED SOUND RECORD AND METHOD OF MAKING SAME

Filed Nov. 16, 1966     5 Sheets-Sheet 4

United States Patent Office 3,535,182
Patented Oct. 20, 1970

3,535,182
**FOIL-SHAPED SOUND RECORD AND
METHOD OF MAKING SAME**
Max Meier-Maletz, Buderich, near Dusseldorf, Germany,
assignor to Intersound Ltd., Lenzburg, Switzerland
Filed Nov. 16, 1966, Ser. No. 599,990
Int. Cl. B31f *1/00;* B32b *31/22*
U.S. Cl. 156—209      16 Claims

ABSTRACT OF THE DISCLOSURE

Foil-shaped records are made with a backing having a marginal portion protruding beyond the sound-track-carrying foil and permitting the separation of the marginal portion from the remainder of the record without a cutting tool. A foil of synthetic material and paper web are fed concurrently and successively circular cuts are effected in the foil, bonding of the cut foil and paper occurs subsequently, followed by sound tracking, additional cutting including a cut for a central hole, rolling of excess foil to one side, and finally severing a finished record from the paper web. Cuts are optionally parallel slits, divergingly widened cut portions inwardly and/or outwardly, angled-off cut portions, oblong holes and the like. Thermobonding of foil and paper web to each other is also provided.

---

The present invention relates to a method of making foil-shaped records carrying sound tracks, and, more specifically, records of a thin foil of synthetic material with sound tracks and a carrier or backing of paper, cardboard and the like, while the said carrier or backing is connected by means of perforation webs to a paper or cardboard rim. Records of this type, which at their marginal areas are connected by perforation webs to a paper or cardboard rim, are among others sold for advertising purposes while the paper or cardboard rim has a rectangular or square shape On this rim, and frequently also below the foil-shaped sound record, if the latter is transparent, writing is provided or there is an indication as to the musical content of the record, and frequently there are found advertisements. Heretofore, the manufacture of such sound records was effected by stamping out the foil in its final size and shape from a web or foil whereupon the stamped-out foil was connected to the backing of paper or cardboard. The sound grooves were then embossed and at the circumferential area of the foil, perforations were cut into the cardboard or paper backing by means of which the carrier of the foil was delimited relative to the marginal area or rim of paper or cardboard. When severing the perforation, the record was obtained.

The heretofore practiced manufacture of such sound records with their backing is time-consuming and awkward inasmuch as the foil had to be completely stamped out from a foil sheet or a foil web of an indefinite size whereupon the thus obtained foil, for further processing operations such as its connection with the carboard or paper backing, had by hand to be placed into the press. Subsequently, the foil with the backing had to be transported to a device for embossing the sound tracks and then manually had to be moved into the embossing press.

It is, therefore, an object of the present invention to provide a method of making foil-shaped records of the above mentioned general type, which will greatly simplify the manufacturing process.

It is another object of this invention to provide a method of making foil-shaped records with a backing, which will permit the manufacture of such records in a continuous way to thereby increase the output thereof while reducing the manufacturing costs.

It is a further object of this invention to provide a record on a backing having a marginal portion protruding beyond the sound track carrying foil, which will permit the separation of said marginal portion from the remainder of the record without a cutting tool.

These and other objects and advantages of the invention will appear more clearly from the following specification in connection with the accompanying drawings, in which:

FIGS. 1 and 2 respectively diagrammatically illustrate two different ways of practicing the method according to the present invention.

FIG. 3 shows cuts formed in the foil web or foil sheet as a step in the manufacturing process according to the present invention.

FIG. 4 shows cuts which in the paper or cardboard backing form a step in the method according to the present invention.

FIGS. 5, 5a and 5b respectively illustrate three different types of cuts as they may be practiced in conformity with the present invention.

Figure 6:
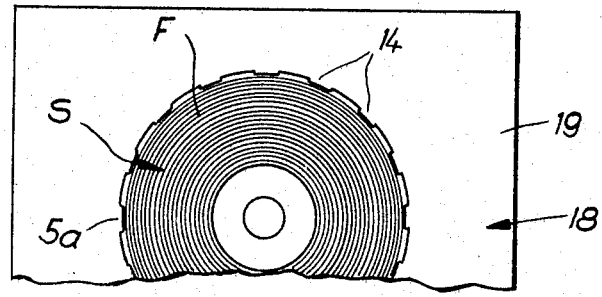

FIG. 6 is a top view of a sound record with its backing.

Figure 7:
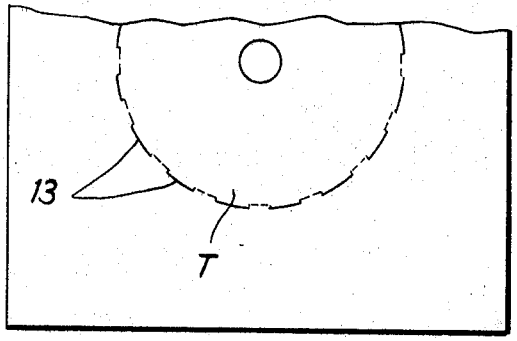

FIG. 7 is the rear view of such backing with the sound foil thereon.

Figure 8:
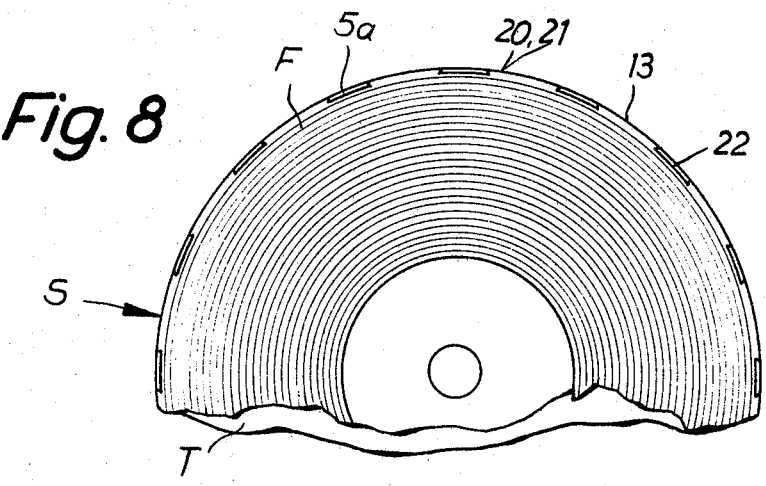

FIG. 8 diagrammatically illustrates a sound record which has been made according to the method of the present invention and which together with its backing has been separated from the paper or cardboard web or sheet.

Figure 9:
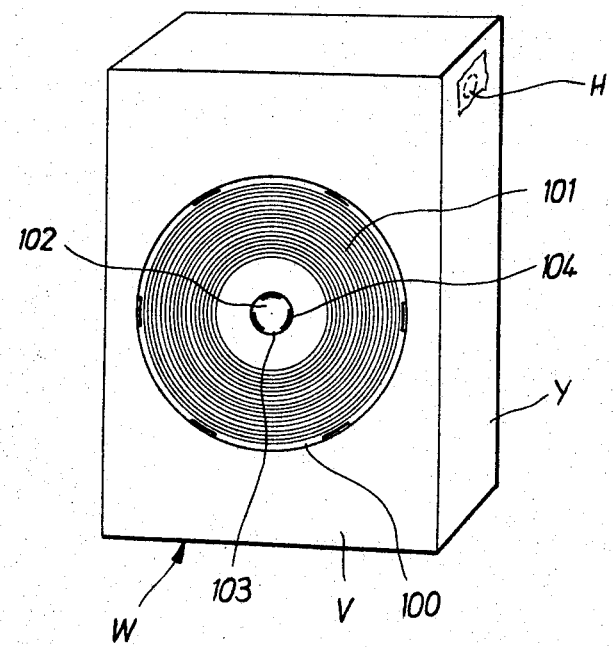

FIG. 9 shows a record according to the present invention used for advertising purposes as a part of a washing powder carton.

Figure 10:
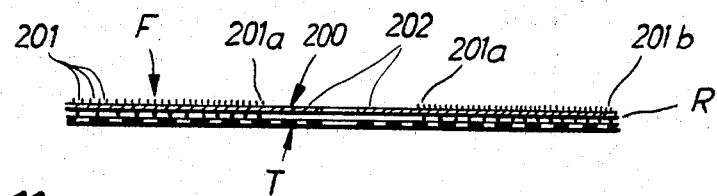

FIG. 10 shows a detail in connection with the connection between the foil and its backing.

Figure 11:
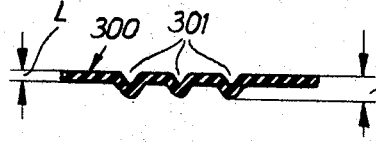
Figure 12:
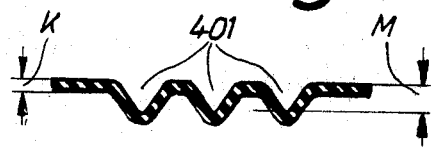

FIGS. 11 and 12 respectively illustrate sections through a portion of sound track foils.

Figure 13:
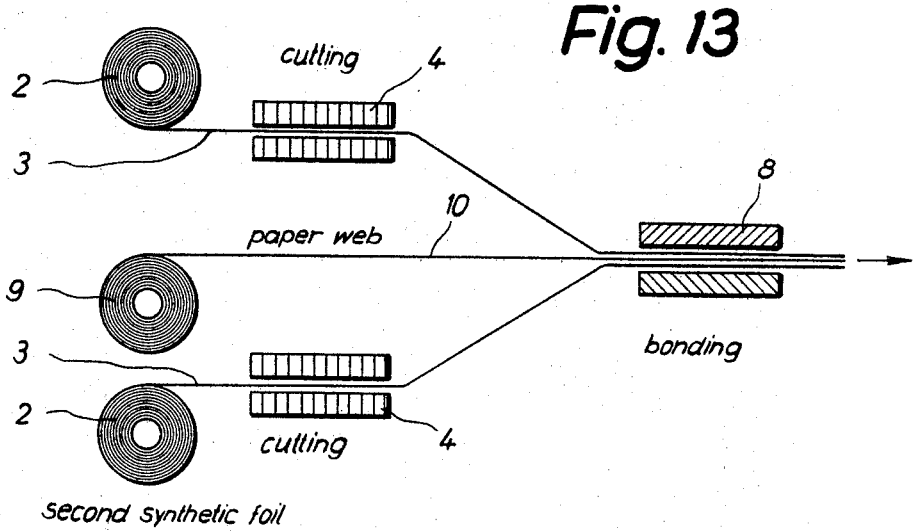
Figure 14:
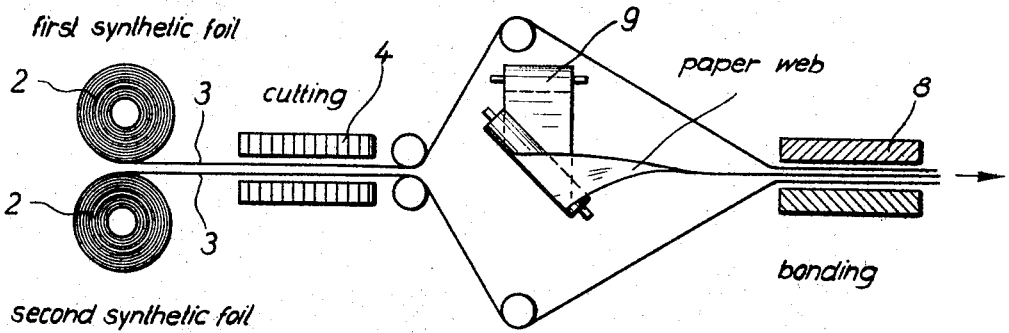
Figure 15:

FIGS. 13, 14 and 15 show modifications of the method according to the invention.

The present invention is based on the fundamental concept that for the transport of foils, a web of foil or a larger foil sheet can be employed from which the foils are formed. In this way, a continuous manufacturing process of the said sound records with their paper or cardboard backing will be created so that the method will be characterized by a considerable increase in the output of such records over heretofore known methods.

In this connection, the present invention provides that into a web of foils or a foil sheet of any suitable size, first spaced cuts are made which determine the shape and size of the record whereupon that portion of the foil web or foil sheet which is confined by said cuts is connected to a paper or cardboard layer forming the carrier and the rim for the record. Prior thereto, simultaneously therewith or afterwards, the sound tracks are pressed into the foil, and second cuts which bridge the interruption between the first cuts are made in the backing, which likewise define the shape of the record. Thus, the method according to the present invention provides for the separation of the foil from a foil web or sheet in two steps.

First cuts are made into the foil web or foil sheet whereby webs are formed which are later severed while this later separating operation will at the same time create a perforation in the paper or cardboard backing in such a way that the foil paste will, in view of the webs remaining in the paper or cardboard layer, remain connected to said paper or cardboard layer. For purposes of using the sound record on a record player, it will suffice by means of a fingernail or a sharp tool to sever the paper webs. The shape and arrangement of the paper or cardboard webs is preferably so selected that the connection of the sound track with the paper or cardboard layer can easily be severed. The invention is based on the further idea to effect the connection of the record with the rim surrounding the same, solely by webs or paper or cardboard because the severing of the foil material with a sharp non-cutting tool or element, for instance a fingernail, would bring about a stretching of the foil material and thus would cause a distortion, especially of the outer sound tracks.

The foil web may be withdrawn from a roll in the form of a band, which means that the first cuts through the foil web are effected in an endless foil roll web. Similarly, the paper or cardboard layers can likewise be withdrawn from a roll in the form of a band, and the successive backings are separated from each other by cuts. These cuts can be effected at the end of the process. The paper or cardboard layers may, however, also in the form of separate sheets be connected with those portions of the foil web or foil sheet which are provided with the first cuts.

The first cuts are preferably effected in the form of oblong holes or in the form of cuts having curved ends or widened ends. The width of said oblong holes, of the curved ends or widened ends depends on the precision with which the first and second foil cuts are carried out with regard to each other, in other words, from the precision with which the second foil cuts can be brought into alignment with the first foil cuts. The width of the oblong holes, the curved ends or widened ends will be less, the more precise the second foil cuts can be brought into alignment with the first foil cuts. The first foil cuts may be equal, smaller or greater than the second cuts effected through the foil and into the paper web or cardboard layer.

Referring now to the drawing in detail and FIG. 1 thereof in particular, this figure shows a roll 2 of a synthetic foil band 3 mounted on a suitable shaft 1. Foil band 3 in unwound condition passes through a device 4 into which, as will be evident from FIG. 3, successively circular cuts 5 are cut. The individual circles I, II, III can in slightly spaced relationship to each other be so arranged that the pull resistance of the foil band will not be harmfully affected. The first cuts 5 into the foil band 3 may have a width $a$ (FIG. 5) and if desired may have their ends provided with outwardly or inwardly widened portions 6 (FIG. 5a) or angled-off portions 7 (FIG. 5b). The diameter of the circles I, II, III along which the cuts 5 are arranged corresponds to the diameter of the desired sound record to be made.

After passing through the device 4, which represents a standard cutting and stamping device, the band 3 is passed through a device 8 in which a thermo-bonding layer is applied for connecting the band 3 with a paper band 10 withdrawn from roll 9. This connection is a well-known heat welding or bonding operation. In the subsequent device 11, the sound tracks are embossed into portions of the foil web 3 which portions are confined by the cuts 5. Thereupon, the two interconnected bands 3 and 10, if desired, after punching a mandrel hole therethrough, are conveyed to the device 12. This device 12, which likewise may be in the form of a standard cutting and stamping device, carries out cuts through the foil web as well as through web 10 of paper or cardboard in such a way that the first cuts 5 will be interconnected or bridged by the cuts therebetween. Such second cuts are shown in FIG. 4 and designated with the reference numeral 13. These second cuts completely separate the foil of the sound record to be made from the foil web 3 while webs or connecting portions remain in the paper or cardboard web 10 which web 10 is preferably wider than the foil web 3. Webs or interconnecting portions 13 are shown in FIG. 6 and designated with the reference numeral 14.

After leaving the device 12, the band 3 provided with round cutouts corresponding to the records made is wound onto a roll 16, whereas band 10 provided with the respective stamped-out foil is by means of a severing knife 17 cut into individual backings 18. The finished record S with the backing 18 is shown in top view in FIG. 6. The record is by webs 14 at its rim 19 connected with the backing and by severing the webs 14 located at the level of cuts 5 of the foils can be separated from rim 19.

The severed record shown in FIG. 8 clearly shows circumferential portions 5a of foil F in view of the cuts 5 and also the superimposed circumferential portions 20, 21 of the foil and the carrier T which have been formed by the cuts 13 through the foil web 3 as well as through web 10 of cardboard or paper. The circumference of the carrier T is confined by the sections 22 which are formed when separating the record S from the rim 19 of the backing.

According to the embodiment of the invention as illustrated in FIG. 2, the foil web 3 is again withdrawn from a roll and is passed through a device 4. The layer of cardboard or paper, however, is according to FIG. 2 in the form of a cut web portion 23 passed through the next device 8 and is there connected with the precut foil. The device 11 embosses the sound grooves, and the device 12 cuts the cuts 13 through the foil and also through the backing. The band 3 has the same appearance as the band 3 of FIG. 1 and is wound onto the roll 16. The record with its backing 18 has the same appearance as the record produced according to FIG. 1.

FIG. 9 shows a box W which may contain, for instance, washing powder. This box is of cardboard or strong paper which is customary manner has one of its narrower sides Y provided with a perforation H which when pierced results in a hole in said box. In unpierced condition, there is, of course, no hole in said box. The front side V of the box carries the foil 100 with the sound tracks 101. In the center of the foil there is a circular perforation which when the box is pierced along said perforation will result in a corresponding hole 102. At the level of this circular perforation through the foil there is provided a plurality of cuts 104 extending along a circle with the radius of hole 102 while between said cuts 104 there are provided webs or interconnecting portions 103. The cuts 104 extend through the cardboard or paper of which the box is made and are such that no washing powder can pass therethrough. By means of said webs 103, the circular cardboard or paper section of the box is held at the level of the hole 102 in the foil, until the said webs 103 are pierced for instance by the fingernail whereby the mandrel hole is formed in the record.

The circumference of the foil 100 and the record backing of cardboard or paper is formed as a portion of the front side V of the box in the same manner as outlined above in connection with the description of FIGS. 1 to 8. Also in this instance the cuts are such that no washing powder can escape from the box.

According to a modification, in distinction of the records described above, it is also possible to mount one foil on the front or rear side of the backing, in which instance two devices 4 or one device 4 for both foils of a record will be employed. In this instance, the first cuts through the foils are in alignment with each other (FIGS. 13, 14).

The foil may also be mounted outside the center of the cardboard layer, and also the sequence of the steps between the first and second cuts may be varied. Thus, the devices 8, 11, 12 of FIGS. 1 and 2 may be combined or their sequence may be exchanged. Preferably, as illustrated in FIG. 10, the foil F which carries the sound tracks 201 is connected with the backing T only below the sound tracks 201, whereas the so-called plane 202 of the foil, i.e. the area within the inner sound track 201a is not connected to the backing. The connection may also extend outside the outer sound track 201b up to the rim R.

The material of foil 300 has preferably, as illustrated in FIG. 11, such a thickness L that the foil at the level of the sound tracks 301 has a thickness L1 which is greater than the thickness L. A foil material, the thickness K of which is less than the depth M of the sound tracks 401 (FIG. 12) is particularly advantageous.

It is, of course, to be understood that the present invention is, by no means, limited to the particular method and sound tracks illustrated in the drawings but also comprises any modifications within the scope of disclosure.

It should also be noted that the present invention is not limited to any specific synthetic material for the record foil but that any suitable synthetic material may be used as for instance polyvinyl chloride or polyvinyl acetate. It is further more to be understood that the foil web and the paper or cardboard web can be temporarily stopped when a cutting operation and the sound track impressing operation is carried out. Any standard mechanism for stepwise advancing and stopping the said webs as it is known for numerous stepwise advanced and stopped conveyer belts and the like may be used in connection with the present invention.

The foil web and the paper or cardboard web can also be moved and cut continuously. The cutting mechanism is hereby moved for a short distance at the same advancing speed as the foil web and the paper or cardboard web, or the cutting mechanism has the form of a stationary roller with cutting knives at its periphery. Mechanism of this kind with chains or rollers are known for instance to produce paper sacs or sacs of synthetic material.

As bonding material between the foil of synthetic material and the paper or cardboard to be connected thereto may be used any suitable material as for instance hot sealing film or plastic dispersion or cellulose dispersion.

The method according the invention is not limited to the use of synthetic foil band with a thermobonding layer. This layer can also be provided on the cardboard or paper as shown in FIG. 15.

What I claim is:

1. A method of making a sound record with readily separable peripheral edge cut-off and with a backing, said sound record having a foil means with an impressed sound track bonded to said backing, comprising the steps of: first cutting into foil means to form first cuts at predetermined locations in the foil means to be impressed with sound tracks said first cut being spaced from each other and arranged along a contour so as to confine the shape and thereby determine the size of the record to be made, then bonding that portion of the foil means which is confined by said first cuts to carrier material forming the backing and the rim of the record to be made, impressing a sound track into the foil means and the carrier material of the thus formed article, cutting second cuts which are spaced from each other but bridge the respective adjacent first cuts whereby simultaneously that portion of the foil means which is confined by said first cuts is completely severed from and cut out of the respective surrounding foil means whereas that portion of the carrier material which is confined by said second cuts remains separably connected to the respective surrounding carrier material by short web-like portions located between said second cuts and forming a perforation in said carrier material along the outer periphery of said cut-out foil means.

2. A method according to claim 1 wherein the sound track is impressed in said foil means prior to bonding said foil means to said carrier material.

3. A method according to claim 1, wherein the sound track is impressed in said foil means simultaneously with the bonding of said foil means to said carrier material.

4. A method according to claim 1, which includes the step of employing the foil means in the form of a foil web being withdrawn from a roll of foil.

5. A method according to claim 1, which includes the step of employing said carrier material in the form of a web being withdrawn from a roll of a paper product material.

6. A method according to claim 1, in which said carrier material is employed in the form of sheets.

7. A method according to claim 1, in which the first cuts are narrow oblong holes.

8. A method according to claim 1, in which said first cuts widen at their ends.

9. A method according to claim 1, in which said first cuts have bends at their ends.

10. A method according to claim 1, in which said first cuts are of substantially the same length as said second cuts.

11. A method according to claim 1, in which said first cuts are shorter than said second cuts.

12. A method according to claim 1, in which said first cuts are longer than said second cuts.

13. A method according to claim 1, which includes the steps of: applying foil means to opposite sides of said carrier material while aligning said two foil means with regard to each other, and carrying out said first cuts so as to cut through both of the foil means.

14. A method according to claim 1, in which the foil means is connected to the carrier material solely below that portion of the foil means which carries the sound tracks.

15. A method according to claim 1, in which said foil means is connected to said carrier material below that portion of said foil means which carries said sound track and also below that portion of the foil means which forms the outer marginal portion of the record-forming foil means portion.

16. A method according to claim 1, in which the paper or the card board is provided with a thermo-bonding layer.

References Cited
UNITED STATES PATENTS

| | | | |
|---|---|---|---|
| 2,714,448 | 8/1955 | Brown | 206—47 |
| 3,052,586 | 9/1962 | Brown | 156—209 |
| 3,072,519 | 1/1963 | Salzman | 156—219 XR |

JOHN T. GOOLKASIAN, Primary Examiner

D. J. FRITSCH, Assistant Examiner

U.S. Cl. X.R.

156—253, 257, 268; 274—42